United States Patent [19]
Burke et al.

[11] Patent Number: 5,420,229
[45] Date of Patent: May 30, 1995

[54] FLUSHING VEHICLES FOR PREPARING FLUSHED ORGANIC PIGMENTS AND METHOD FOR PREPARING THE SAME

[75] Inventors: Roger E. Burke, Mursfreesboro; J. Gilbert Sprull, Colerain, both of N.C.

[73] Assignee: Resinall Corporation, Stamford, Conn.

[21] Appl. No.: 153,533

[22] Filed: Nov. 16, 1993

[51] Int. Cl.$^6$ .......................... C08G 8/34; C08G 69/34
[52] U.S. Cl. ........................... 528/335; 528/129; 528/336; 528/339.3; 528/340; 528/345; 528/346; 524/600; 524/606; 524/607; 523/158; 523/160; 527/600; 260/DIG. 38; 106/262
[58] Field of Search ............... 528/340, 129, 335, 336, 528/345, 346, 339.3; 106/262; 523/158, 160; 524/606, 600, 607; 260/DIG. 38; 527/600

[56] References Cited

U.S. PATENT DOCUMENTS

| | | |
|---|---|---|
| 2,540,776 | 2/1951 | Cadwell . |
| 3,637,638 | 1/1972 | Sloan . |
| 3,776,865 | 12/1973 | Glaser et al. . |
| 3,778,394 | 12/1973 | Lovald et al. . |
| 4,312,631 | 1/1982 | Cuntze et al. . |
| 4,400,216 | 8/1983 | Arora ................................. 524/612 |
| 4,514,540 | 4/1985 | Peck . |
| 4,519,841 | 5/1985 | Moynihan . |
| 4,612,272 | 9/1986 | Westdale . |
| 4,612,273 | 9/1986 | Westdale et al. . |
| 4,623,392 | 11/1986 | Ou-Yang . |
| 4,639,492 | 1/1987 | Makhlouf et al. ................ 525/54.42 |
| 4,683,262 | 7/1987 | Whyzmuzis et al. . |
| 4,690,712 | 9/1987 | Janusz . |
| 4,810,747 | 3/1989 | Bornack, Jr. et al. . |
| 4,816,549 | 3/1989 | Rumack . |
| 4,870,119 | 9/1989 | Yee et al. . |
| 4,891,071 | 1/1990 | Dilling et al. . |
| 4,894,433 | 1/1990 | Bornack, Jr. et al. . |
| 4,910,236 | 3/1990 | Foye et al. . |
| 4,973,617 | 11/1990 | Incontro et al. . |
| 5,019,622 | 5/1991 | Burke et al. ......................... 524/532 |
| 5,021,538 | 6/1991 | Crews . |
| 5,085,699 | 2/1992 | Hutter . |
| 5,098,479 | 3/1992 | Hutter . |

OTHER PUBLICATIONS

*The Printing Ink Manual,* Society of British Printing Ink Manufacturs Ltd., Leach, D. H., et al. (4th Ed.), pp. cover, Contents, 360–361, 602–605.
Kirk Othmer's *Concise Encyclopedia of Chemical Technology,* Ed. D. Eckroth et al., John Wiley & Sons (1985) pp. 889–892.
*Naval Stores, Production, Chemistry, Utilization: Rosin—based Printing Inks,* Pulp Chemicals Association, (1989), Roger E. Burke, pp. Cover, Contents, 665–700.
*Naval Stores, Production, Chemistry, Utilization: Other Uses of Fatty Acids,* Pulp Chemicals Association, (1989), Kenneth S. Ennor et al., pp. Cover, Contents, Preface, 780–791, 796–799.
Kirk Othmer's *Encyclopedia of Chemical Technology,* Ed. D. Eckroth et al., John Wiley & Sons (1982), pp. Cover, 870–875, 888–889.
*The Dimer Acids,* Ed. E. C. Leonard, Humko Sheffield Chemical, pp. Cover vi–vii, 34–41.
Kirk Othmer's *Encyclopedia of Chemical Technology,* Ed. D. Eckroth et al., John Wiley & Sons (3rd Ed., vol. 7) 1979, "Copper Alloys to Distillation", pp. cover, Contents, 768–781.

Primary Examiner—Paul R. Michl
Assistant Examiner—P. Hampton-Hightower
Attorney, Agent, or Firm—Darby & Darby

[57] ABSTRACT

A flushing vehicle for lithographic inks is the reaction product of a tall oil rosin-modified maleic ester resin with an acid number of less than about 30, and about 2–16 wt. %, based on the weight of the ester, of a polyamide resin with an amine number less than about 110. The flushing vehicle is prepared by heating a reaction mixture containing the rosin-modified ester and the polyamide resin to a temperature of about 190°–280° C.; and holding at a temperature of 190°–280° C. until the viscosity of the reaction mixture becomes constant.

29 Claims, No Drawings

FLUSHING VEHICLES FOR PREPARING FLUSHED ORGANIC PIGMENTS AND METHOD FOR PREPARING THE SAME

This invention relates to a resin, compositions containing the resin, and methods for preparing and using the same as flushing vehicles. In particular, this invention relates to resin derived by reaction of a polyamide, a rosin-modified maleic ester, and optional soybean oil. The resins of the present invention may be used as flushing vehicles for preparing flushed organic pigments for lithographic inks.

BACKGROUND OF THE INVENTION

The process for preparing flushed pigments involves the addition of a flushing vehicle, such as an oil or a solution of resins and other additives in an oil or organic solvent, to a water-precipitated organic pigment known as presscake. The direct transfer or "flushing" of the pigment particles from the aqueous phase to the oil or non-polar phase is effected by kneading the presscake and vehicle together in a flusher or heavy-duty mixer under heat and vacuum. For a review of organic pigments and pigment dispersion processes, see "The Printing Ink Manual" fourth edition, Ed. R. H. Leach et al.; Van Nostrand Reinhold Co., Ltd; England, 1988, pages 602 to 604; and Kirk Othmer's "Concise Encyclopedia of Chemical Technology" Ed. D. Eckroth et al.; John Wiley & Sons, 1985, pages 869–892.

A dispersing resin for lithographic ink pigments must exhibit excellent pigment wetting properties when mixed with the highly aqueous presscake during flushing. These pigment wetting properties provide rapid and thorough coverage of the pigment particles and concurrent displacement of water originally bound to or trapped in the particle aggregates. A resin with good wetting properties adheres strongly to primary particle units and coats them to provide a stearic barrier to reaggregation. The resulting dispersed pigment concentrate exhibits improved color strength, gloss and transparency, as well as reduced bronzing. Representative examples of conventional commercial flushing components used in producing lithographic inks include soluble dibasic acid modified rosin esters, rosin modified phenolic esters, hydrocarbon resins and various specialty alkyds. A resin used as a flushing vehicle for lithographic inks must generally be stable in storage to viscosity, color and solubility. When used as an ink and applied to paper, the finished ink must dry quickly to provide a durable, smooth and uniform film which is resistant to abrasion and chemicals.

It is known in the art that useful dispersants for lithographic inks may be produced from phenolic resins prepared by reacting rosin with phenols and formaldehyde to provide a phenol-rosin condensate containing reactive double bonds. The phenol resin condensate may be further reacted with alpha-beta unsaturated carbonyl compounds to produce Diels-Adler and adducts, which may be esterified with polyols to produce resins with a low residual acid number.

As explained in U.S. Pat. No. 5,021,538 to Crews, these polyol esters of the phenol resin condensates are highly crosslinked, non-uniform three dimensional molecules which do not exhibit highly polar surface structures necessary for enhanced pigment wetting. The Crews reference teaches that pigment wetting characteristics may be improved by attaching polar polyamide functional groups to the polyol esters of the phenol resin condensates.

SUMMARY OF THE INVENTION

The present invention is a flush vehicle for lithographic inks, comprising the reaction product of a tall oil rosin-modified maleic ester resin with an acid number of less than about 30, and about 2–16 wt. %, based on the weight of the ester, of an polyamide resin with an amine number less than about 110. In a preferred embodiment, the present flush vehicle further comprises about 35–60 wt. % of soybean oil.

The present invention also includes a method for preparing a flushing vehicle, comprising the steps of heating a reaction mixture containing a rosin-modified ester with an acid number of less than about 30, and about 2–16 wt. %, based on the weight of the ester, of a polyamide resin with an amine number less than about 110, to a temperature of about 190°–280° C.; and holding at a temperature of 190°–280° C. until the reaction mixture reaches a constant viscosity. In a preferred embodiment, an oil, such as an ink oil or a vegetable oil, preferably a vegetable oil, is included in the reaction mixture as a co-reactant and/or added to the flushing vehicle as a solvent or modifier following the holding step.

Other resins, such as, for example, hydrocarbon based resins, hydrocarbon modified rosin ester resins, or phenolic modified rosin ester resins may be included in the reaction mixture as a co-reactant and/or added to the flushing vehicle as a solvent or modifier following the holding step.

Following the holding step, the resin of the invention may be formulated into flushing vehicles by addition of a suitable solvent such as, for example, a petroleum distillate, ink oil, naphthenic hydrocarbon, or vegetable oil. The resin of the invention also may be formulated into lithographic inks comprising water-insoluble pigments.

Flushing vehicles containing the resin of the present invention have a number of associated advantages which include greatly improved pigment dispersion as measured by a pigment bleach test for color strength, and improved speed of water break during flushing. This improved dispersion provides a flushed pigment which may be formulated with a higher pigment content at equal or pumpable viscosity, compared to conventional flushing vehicles. The dispersion of the vehicle of the present invention provides enhanced rheological stability at high pigment loading levels, and improved stability resulting from resistance to viscosity changes in storage, particularly with Lithol Rubines (red pigments), relative to conventional flushing vehicles. The flushing vehicles of the invention allow for the manufacture of flushed organic pigments of superior strength and concentration while increasing productivity and flexibility in their manufacture.

Accordingly, it is an object of the invention to provide a resin and flushing vehicle containing the resin for use in preparing flushed organic pigments.

It is another object of the invention to provide a method for preparing a resin from a polyamide, a rosin-modified maleic ester, and optional soybean oil.

These and other objects will become apparent in light of the detailed description below.

DETAILED DESCRIPTION OF THE INVENTION

All patents, patent applications and literature references cited herein are incorporated by reference in their entirety.

The present flush vehicle is the reaction product of a tall oil rosin-modified maleic ester with an acid number of less than about 30 and a polyamide resin with an amine number less than about 110. The present flush vehicle preferably further includes soybean oil.

The present invention arose from the discovery that a resin, produced by a reaction between a rosin-modified ester, prepared by reacting a rosin with a dibasic acid and a polyhydric alcohol, and a polyamide resin derived from polycondensation of dimer acids with either diamines or aliphatic polyamines, at a temperature of about 190°–280° C. provides a flushing vehicle having improved flushing performance relative to conventional flushing vehicles.

Comparison of the acid and amine numbers of the products with those of the reactants indicates that no significant esterification or amidization occurs in the present process during the reaction between the rosin ester and the polyamide resin. The reaction temperature is maintained until the viscosity of the reaction mixture, which normally decreases with increasing temperature, becomes constant, and the mixture clarifies. While not wishing to be bound by any theory, Applicants believe the viscosity behavior of the reaction mixture indicates that the specified reaction temperature conditions increase the compatibility of the rosin modified ester and polyamide resin components through ester-amide interchange, which provides enhanced wetting of the pigment particles and improved pigment dispersion. The amide bond may also provide polar sites for pigment surface interaction; however, the vehicle system must be compatible if the flush is to provide gloss and other desirable ink properties.

Particularly outstanding flushing vehicles were obtained when soybean oil was included as a co-reactant in preparing the resin and/or as solvent in the vehicle. The soya oil, as a fatty triglyceride, is believed to react with the polyamide component in the same way as the rosin ester component, and further enhances compatibility of the rosin ester and polyamide.

The rosin acids of the present invention are derived from refinement of oleoresin obtained from *Pinus paiustris* and are commercially available as gum rosin, wood rosin and tall oil rosin. Tall oil rosin is particularly preferred for reasons of economy.

The rosin-modified esters utilized in the present invention are well known, and prepared by reacting a Diels-Alder adduct, formed from a rosin acid and an unsaturated dibasic acid, with a polyhydric alcohol.

The unsaturated dibasic acids utilized to prepare the rosin modified esters of the present invention may vary widely, as long as the acids are capable of participating in a Diels-Alder adduction to rosin to form a tribasic acid. Aliphatic unsaturated dicarboxylic acids or anhydrides are preferred for this reaction, and such compounds may be selected, for example, from maleic anhydride, maleic acid, or fumaric acid. Maleic anhydride and fumaric acid are particularly preferred for use in the present invention.

As explained in U.S. Pat. No. 5,021,538 to Crews and *Naval Stores,* Zinkel and Russell, eds., Pulp Chemicals Association, New York, 1989, at pages 682–686, variations in the degree of dibasic modification and the particular alcohol selected for esterification may provide rosin modified esters with a broad range of properties. The preferred rosin adducts of the present invention consist of about 6–10% by weight of the dibasic acid, and have an acid number of less than about 30. The adduct preferably contains about 44–77 equivalent percent of the unsaturated aliphatic dicarboxylic acid anhydride to 100 equivalent percent of rosin acid. If the concentration of dibasic acid in the rosin adducts increases above about 10% by weight, gelation of the esterified product becomes a problem, and production of an ester with the required low acid number and solubility becomes difficult. The rosin adducts utilized in the present invention preferably have an acid number of less than 25, and most preferably exhibit an acid number less than about 20. As used in the present invention, the acid number is defined as the number of milligrams of potassium hydroxide required to neutralize a one gram resin sample under standard test conditions, as described in ASTM D465-59.

The polyhydric alcohol utilized in producing the rosin modified ester may also vary widely, but preferably is selected from the group consisting of ethylene glycol, glycerol, pentaerythritol, and sorbitol. Pentaerythritol is particularly preferred for esterification in the present invention.

The rosin modified esters of the present invention are classified as oil soluble resins, and are compatible with or soluble in vegetable oils and solvents commonly used in lithographic inks. Examples of such compatible vegetable oils are linseed, soya and tung oils. Useful forms include various degrees of refinement and chemical modification, such as heat-bodied and long oil alkyds. Useful solvents include numerous petroleum distillates which are commonly referred to as ink oils. An example of a preferred ink oil is Magiesol ® 47, produced by the Magie Bros. Oil Co., a division of Pennzoil.

The solubility of the above resins may be evaluated by dilution of the resin with a selected oil to its cloud point. Test results are often expressed as grams of diluent solvent/10 grams of test vehicle or resin solution.

In general, the preferred rosin acid ester adduct of the present invention is made by heating a dibasic acid, such as maleic anhydride, with rosin acid and a polyhydric alcohol, such as pentaerythritol, in the presence of a catalyst such as MgO. The adduct reaction between the rosin and maleic anhydride is conducted at a temperature ranging between about 190° C. and about 220° C. for a period of between about half an hour and about three hours. The polyhydric alcohol is then added and the reaction mixture is heated to about 270° C. for esterification and determination of final properties, such as acid number, viscosity and solubility.

A rosin modified maleic ester prepared by esterification of the rosin adduct with pentaerythritol is particularly preferred for use in the present invention. The most preferred rosin modified maleic ester has an acid number of less than about 25, a softening point of about 120°–150° C., and a solution viscosity in Magiesol 47 at 50% solids of 100–1200 cps at 25° C. Suitable commercial rosin-modified esters are available from a wide variety of commercial sources, including Hercules Corp. (Pentalyn ® G and Pentex ® G), Union Camp Corp. (Uni-rez ® 7100) and AKZO Coatings and Resins (Filtrez ® 3740).

The polyamide resins utilized in the present invention for reactions with the rosin modified ester adducts are generally prepared by polycondensation of dimer acids and fatty acids with either diamines or aliphatic polyamines (See generally *Naval Stores*, Zinkel and Russell, eds., Pulp Chemical Association, New York (1989) at pages 783–788).

The dimer acids reacted with the diamines and aliphatic polyamines to produce the polyamide resins of the present invention are aliphatic, cycloaliphatic or aromatic dicarboxylic acids which may be defined by the formula:

HOOC—R—COOH where R is an aliphatic, cycloaliphatic or aromatic hydrocarbon radical having from 6–20 carbon atoms. Examples of such dimerized fatty acids include adipic, sebacic, pimelic, azelaic, succinic, glutaric, isophthalic, terephthalic, phthalic, napthalene dicarboxylic acids and 1,4 or 1,3 cyclohexane dicarboxylic acid. The preferred dimer acid is a dimerized fatty acid, and the most preferred are dimerized tall oil fatty acids. The dimerized fatty acids may be utilized alone, or as mixtures, or as mixtures with fatty acids.

Polyamide resins prepared by reaction of the above diamines with stoichiometric amounts of dibasic acids and fatty acids are referred to as neutral polyamide resins based on their low amine number, and are preferred for use in the present invention. The preferred amine component of the neutral polyamide resin of the present invention is a alkylene diamine which can be represented by the formula:

$H_2N—[R']_x—NH_2$ where R' is an alkylene radical having from 2–8 carbon atoms, and x is an integer of 1-6, most preferably 2. Examples of such compounds include ethylene diamine, diaminopropane, diaminobutane pentamethylene diamine and hexamethylene diamine. The preferred alkylene diamine, are ethylene diamine and pentamethylene diamine, and the most preferred is ethylene diamine.

While the neutral polyamide resins are preferred for use in the present invention, the reactive polyamide resins, which are generally prepared by polycondensation of dimerized tall oil fatty acids with an excess of aliphatic polyamines, may also be employed. In addition, a mixture of neutral and reactive polyamide resins may be used. The alkylene polyamines of the invention may be represented by the formula

$H_2N—[R''NH]_x—H$ where R'' is alkylene or aromatic radical having from 2–10 carbon atoms, and x is an integer of 1–4. Preferably, polyamines utilized in the present invention will have from 2–6 carbon atoms per molecule so that x equals 1–3. Examples of alkylene polyamines which may be utilized in the present invention are ethylene diamine, triethylene tetraamine, 1,4-diaminobutane, 2-methylpentane-1,5 diamine, and 1,8-diaminonapthalene, and the like. The preferred alkylene polyamines are ethylene diamine and triethylene tetraamine, and the most preferred is ethylene diamine.

The polyamide resins of the present invention should have an amine number of less than about 110, more preferably less than about 30, most preferably about 10. The amine number determines in part how compatible the polyamide resin will be after reaction with the rosin modified maleic ester. If the amine number is relatively low, amide ester interchange with the carboxyl groups of the rosin ester occurs rapidly. If the amine number is too high, amidization of the rosin maleic ester acidity essentially does not occur, and the amine number for the resulting flush vehicle will become too high, causing the flushing vehicle to become water sensitive and not properly break water during flushing. This leads to bleed at water break and subsequent sensitivity to the lithographic fountain solution in the ink. Further, high amine number could result in reactivity with various organic pigments and poor solubility in ink oils.

The Ring and Ball softening point of the polyamide resin is preferably about 105°-° C., as measured according to ASTM 29 (E28).

The preferred polyamide resin used in preparing the resin product of the present invention is a reaction product of dimer fatty acid, tall oil fatty acid, and ethylene diamine (DETA). The polyamide resin is prepared by heating a dimer fatty acid, and a diamine, as explained, for example, in U.S. Pat. No. 3,778,394.

This type of polyamide resin is commercially available and is generally used as a gelling agent in oil-based paint, and as a component of inks, coatings and adhesives. Such polyamide resins are available, for example, from General Mills (Versamide ® 930/940); Union Camp (Uni-rez 2940); Lawter International, Inc. and Emery Industries.

Initially, the unmodified polyamide resin is only partially soluble in the maleic resin, or in the vegetable and ink oils commonly utilized as lithographic flush vehicles; however, as the polyamide resin reacts with the rosin modified ester it becomes compatible. The improved compatibility may be monitored by a gradual reduction in viscosity, gradual clarification of the reaction mixture, and improved higher dilution values with diluent solvent.

The reaction mixture is heated until it clarifies and the viscosity becomes constant; this indicates that the rosin modified ester and the polyamide resin have fully compatibilized. The techniques for measuring and monitoring viscosity of the reaction mixture are well known to those of ordinary skill in the art. The Brookfield viscosity of the mixture following completion of heating should be between about 100 and about 2000 cps, measured at 90° C. The ester/amide interchange believed to occur in the method of the present invention is both time and temperature dependent, i.e. the higher the temperature, the more rapidly the interchange occurs. However, the interchange is believed to start at a temperature of about 190° C., so the method of the present invention is more highly dependent on temperature than on time. According to the invention, a mixture of the rosin-modified ester and polyamide resin is heated at a temperature ranging between about 190° C. and about 280° C., preferably between about 240° C. and about 265° C. and most preferably between about 245° C. and about 260° C. Depending on reaction temperature, the components making up the mixture are heated for a period ranging between about one hour and about three hours. A reaction time of about 2 hours is preferred for a reaction temperature of about 245°-260° C. At 245°-260° C., reaction periods greater than three hours are unnecessary and do not significantly improve the performance of the resin.

The amount of polyamide resin used in the reaction mixture broadly ranges between about 2 to about 16 wt. %, preferably between about 4 to about 8 wt. %, based on the weight of the rosin modified ester. There is, however, a limit on the amount of rosin polyamide resin which can be made soluble by a given weight of rosin modified ester, and, at concentrations greater than 16 wt %, the mixture becomes incompatible, particularly with polyamide resins having an elevated amine number. Further, the reaction mixture should most preferably have an acid number of less than about 15, wherein the acid number is calculated by multiplying the acid number of the rosin maleic resin times its weight in the reaction mixture. For example, a rosin maleic resin with an acid number of 30 which comprised 50% of the reaction mixture would provide a vehicle with an acid number of about 15.

In practicing this invention, it is preferred that a vegetable oil be included in the reaction mixture as a co-reactant with the rosin modified maleic ester and the polyamide resin component, or used as a solvent for dissolving or dispersing the resin product in the flushing vehicle. It is particularly preferred, however, that the vegetable oil be included as a co-reactant in preparing the resin product. It is believed that the vegetable oil, as a fatty triglyceride, reacts with the polyamide resin in the same way as the rosin modified ester, and enhances the compatibility of the polyamide resin and rosin modified ester components to provide a particularly outstanding flushing vehicle.

The vegetable oils which may be utilized in the present invention may vary widely, but various grades of soybean oil, a well known component of lithographic printing inks, are particularly preferred. The grade of vegetable oil utilized in the present invention is not critical, although alkali refined soya oil is preferred. A refined salad grade soybean oil for use in the present invention may be obtained from Prillman Chemical Corp, Richmond, Va.

The amount of vegetable oil used as co-reactant generally ranges between about 2 wt. % to about 50 wt. %, preferably between about 15 wt. % and about 25 wt. %, based on the total vehicle weight.

The copolymer resin of the present invention may optionally be prepared using a portion of the vegetable oil at reaction temperature, and then reduced with either the balance of the vegetable oil or a suitable ink oil. Such a post addition may be made at any time during the reaction process, but the ink oil is preferably added when the reaction mixture is below about 210° C., and the vegetable oil is preferably added when the reaction mixture is below about 200° C.

Following completion of the reaction, the copolymer resin product may be cooled to room temperature and stored in a solid form, such as flakes, for later use, or the resin may be formulated directly into flushing vehicles by dissolving or dispersing the resin into a suitable oil or solvent. Only a limited amount of oil may be utilized in preparing a resin which is to be cooled to solid form, so the in situ process is preferred. In general, in such a solution process the amount of copolymer resin product employed ranges between about 90 and about 30 wt. %, preferably between about 70 and about 50 wt. %, based on the total vehicle weight. Suitable, but non-limiting, solvents for use in making the flushing vehicle include the many narrow high boiling petroleum fractions commonly used in lithographic and oil letterpress inks. These solvents, commonly called ink oils, have boiling points from about 230° C. to about 320° C. Above 320° C. the solvents are usually classified as mineral oils. An important characteristic of an ink oil is the narrow temperature range, usually between 20°–30° C., between initial and final boiling point. A preferred solvent or ink oil is Magiesol 47. Soya or other vegetable oil may be used to replace all or a part of the petroleum based solvent. The solvent selected is largely controlled by the intended ink application.

If desired, additives may be incorporated during formulation of the flushing vehicle to modify its properties. Such additives may be present during the reaction of the rosin modified ester, polyamide resin and soya oil components, but are preferably added to the reaction mixture upon completion of the reaction and at temperatures below about 200° C. This low temperature assures the addition is present as a component of a mixture or dispersion and not as a chemically reacted component. Suitable, but non-limiting, additives include special isophthalic long oil alkyds, phenolic-modified rosin esters, bodied vegetable oils, solvent sweeteners such as Tridecanol, TXIB (2,2,4 trimethyldiisobutyrate, available from Eastman Chemical Products, Kingsport, Tenn.) and other modifiers used by those of ordinary skill in the art. Small proportions of these additives are used to modify various characteristics of the resin and solvent combination.

Flushed pigments obtained by use of the flushing vehicle of the invention may be formulated into oil inks suitable for lithographic and letterpress uses. Such inks may be prepared by dispersing the flushed pigment into a resin vehicle, solvent, and/or diluents and additives such as driers, waxes, antioxidants, anti-set-off compounds, rheology modifiers such as aluminum gellants and chelates, montmorillonite clays and fumed silicas, and other modifiers commonly used in formulas of lithographic heat set and quick set inks.

A wide variety of pigments may be flushed with the vehicle of the present invention. Typical examples include diarylide yellow, phloxine red, alkali blue, lithol rubine, phthalocyanine green, and phthalocyanine blue.

The following Examples are illustrative of the present invention, but do not serve to limit its scope.

EXAMPLE 1

Preparation of a Rosin-modified Maleic Ester

The preparation of rosin modified esters is well known in the art. About 79 parts by weight rosin derived from distilled tall oil was heated and melted. When the temperature reached 175° C., about 8 parts by weight maleic anhydride was added, and the temperature of the mixture was increased to 200°–210° C. The rosin and maleic anhydride were held at bout 205°–210° C. for about 1 hour to complete adduction by the Diels Alder reaction. The reaction product was then cooled to about 200° C., and about 12 parts by weight of pentaerythritol was added, followed by 0.5 parts by weight of an esterification catalyst, CaO. The mixture was then rapidly heated to about 260°–270° C. and held for final properties.

A typical rosin modified maleic ester may be obtained from Resinall Corp., Severn, N.C., as Resinall 434, or from Union Camp Corp., Wayne, N.J. as Uni-rez 7100.

EXAMPLE 2

Preparation of Polyamide Resin

About 79 parts by weight of a dimer fatty acid, Unidyne 18, available from Union Camp Corp., and about 12 parts by weight of a tall oil fatty acid, Unitol GMS, also available from Union Camp, were charged to a suitable resin reactor and heated to 80°–90° C. under a nitrogen blanket. About 9 parts by weight of 98% ethylene diamine (EDA) were charged to the reactor below the surface with cooling so the exotherm did not exceed about 100° C. When the EDA addition was complete, the reactor vent was closed and the mixture was carefully heated. The pressure was allowed to build to about 40 psig. Water of reaction evolved at about 135° C. and caused a rapid buildup of pressure, which was maintained at about 40 psig by venting the reactor and heating.

When the temperature reached 180° C., the reactor was vented to atmospheric pressure and sampled for acid and amine numbers, and then sampled again at about 200° C. and 225° C. The reactive product was held at 225° C. for about 1 hour and adjusted as necessary for acid and amine numbers, and then steam sparged under vacuum of at least 26 in Hg for about 3 hours. The reactor was finally cooled under vacuum to 165° C. and the resin discharged. The resulting polyamide resin had the following properties:

| Softening Point (°C.), R & B | 105–115 |
| Acid Number | 4.0 max |
| Amine Number | 3.5 max |
| Color (40% in propanol) | 7 max |

Typical polyamides with the above properties may be obtained from the Union Camp Corp. as Uni-Rez 2940.

EXAMPLE 3

Preparation of Flushing Vehicles Containing Soya Oil

A flushing vehicle, designated vehicle 1, was prepared from a mixture of the rosin modified maleic ester, prepared as described in Example 1, a polyamide prepared as described in Example 2, and in *The Dimer Acids*, E. C. Leonard, ed. Humko Sheffield Chemical, Memphis, Tenn., 1974, were reacted in the presence of soybean oil. The reaction product was then cooled and blended with a phenolic modified rosin ester resin and an aromatic hydrocarbon resin.

Soya oil (1372 grams, 39.21 wt. %) was charged into a 5 liter reaction vessel fitted with a water condenser and stirrer, under a nitrogen atmosphere, and heated to 120° C. Thereafter, 1551 grams (44.30 wt. %) of a rosin modified maleic ester, Resinall 434, available from the Resinall Corp., was added in small portions into the vessel while heating. 107 grams (3.05 wt. %) of a polyamide, Uni-rez 2940, was added and the reaction mixture was heated to and maintained at 250° C. until the viscosity became constant and the mixture clarified, a period of about 2 hours. The reaction mixture was then cooled to 220° C. and 146 grams (4.18 wt. %) Sartomer A-110, a non-reactive aromatic hydrocarbon resin available from the Sartomer Corp., Easton, Pa., was added to cool the resin/soya dispersion and act as a solubility modifier. The resulting mixture was further cooled to about 170°–190° C., preferably below 170° C., and 325 grams (9.26 wt. %) Resinall 903, a conventional phenolic modified rosin ester available from Resinall Corp., was added. The mixture was maintained at 170° C. for one hour, cooled and adjusted with oil or resin for a target viscosity specification of 500–650 seconds, line to line in standard Gardner viscosity tube adjusted to 100° F. in a suitable water bath. The resultant product was collected and sealed in a container for later use.

Three additional flush vehicles, designated as vehicles 2–4, were prepared by the same procedure as vehicle 1, except that the polyamide component was not added. In general, to prepare vehicles 2–4, soya oil and various resins described in Table 1 below were charged to a reaction flask and heated rapidly to about 250° C. and held for two hours. The reaction product was then cooled to below 180° C. and adjusted with oil or resin for a target Gardner line to line viscosity of 500–650 seconds at 100° F.

TABLE 1

| Vehicle | 1 | 2 | 3 | 4 |
|---|---|---|---|---|
| Resin A (wt. %) | 43.9 | 50.2 | — | 40.0 |
| Resin B (wt. %) | 3.0 | — | — | — |
| Resin C (wt. %) | 9.2 | — | — | 13.5 |
| Resin D (wt. %) | 4.1 | 12.1 | — | — |
| Resin E (wt. %) | — | — | 49.7 | — |
| Soya Oil (wt. %) | 39.8 | 37.7 | 50.3 | 46.4 |
| Total (wt. %) | 100.0 | 100.0 | 100.0 | 100.0 |

The resins listed in Table 1 are as follows:
Resin A—Resinall 434 (rosin maleic ester)
Resin B—Uni-rez 2940 (polyamide)
Resin C—Resinall 903 (phenolic modified rosin ester)
Resin D—Resinall 725 (aromatic hydrocarbon resin)
Resin E—Resinall 524 (hydrocarbon modified rosin ester)

The resulting vehicle was discharged from the reaction vessel and tested for the properties in Table 2 below:

TABLE 2

| Vehicle | 1 | 2 | 3 | 4 |
|---|---|---|---|---|
| Brookfield Viscosity 60° C. (cps) | 6570 | 5120 | 6470 | 6020 |
| Brookfield Viscosity 90° C. (cps) | 670 | 576 | 804 | 735 |
| Acid Number | 11 | 11.5 | 10.6 | 9.9 |
| Density (lbs/gal) | 8.34 | 8.43 | 8.49 | 8.48 |
| Solvent Tolerance g/10 g Isopropanol | 4.9 | 4.3 | 2.8 | 4.6 |
| Solvent Tolerance g/10 g Magiesol 47 | >200 | >200 | 8.9 | >200 |
| Laray Viscosity, 2000 g 25° C. (sec) | 38.0 | 40.3 | 34.9 | 32.5 |
| Laray Viscosity, 4000 g 25° C. (sec) | 19.9 | 21.6 | 15.9 | 16.9 |

EXAMPLE 4

Evaluation of Flushing Vehicles

The resin solutions prepared in Example 3 were tested with the same lot of lithol rubine presscake under identical testing procedures. Each of the finished flush colors were produced by three water breaks, using a total of 1000 grams of presscake and 120 grams of resin solution. The finished flushed color contained 38% pigment. Table 3 below summarizes the time and water percentages generated per water break.

TABLE 3

| Resin vehicle | Time to 1st Clear Break (min.) (% H$_2$O) | Time to 2nd Clear Break (% H$_2$O) | Time to 3rd Clear Break (% H$_2$O) |
|---|---|---|---|
| 1 | 50 (77.3%) | 10 (71.5%) | 12 (69.2%) |
| 2 | 48 (80%) | 10 (77%) | 12 (75.9%) |
| 3 | 24 (76.1%) | 18 (71.1%) | 16 (46.2%) |
| 4 | 60 (77.4%) | 14 (76.3%) | 10 (71.5%) |

The four finished flush colors were bleached for tinctorial strength. All four flush colors demonstrated equal color strength. The flush colors were then examined for qualitative properties. Table 4 summarizes the qualitative properties obtained for each flush-color.

TABLE 4

| Resin Solution | Water Shed | Viscosity | Wetting | Tint Strength |
|---|---|---|---|---|
| 1 | Best | Soft | Good | Equal |
| 2 | Good | Soft | Good | Equal |
| 3 | Poor | Hard | Poor | Poor |
| 4 | Fair | Soft | Fair | Equal |

The experiments performed in Example 4 compare various soya based flushing vehicles, which do not utilize petroleum based ink oils.

As shown in Tables 3–4, resin solution 1, which incorporates a polyamide and is prepared by the method of the present invention, produced a flush color with a soft body that had good length and flow and was well-wetted with very low bronze. Resin solution 1 had the best gloss among the tested resins.

Resin solution 2 produced a flush color with a soft body that had good length and flow and was well-wetted with little bronze. This resin gave the best water shed and good gloss.

Resin solution 3 produced a poor flush color with a hard body and heavy flow. The flush pigment was flat, dry, and exhibited very poor wetting and gloss.

Resin solution 4 produced a flush color that was short, buttery and semi-wetted. This flush color was not as poor as the one produced by resin solution 3 and showed at least a minimal amount of wetting and gloss.

In sum, resin solution 1 produced an outstanding flush color compared to the remaining solutions tested, as well as comparable water shed. The addition of the polyamide provides a flushing vehicle with outstanding wetting capabilities, which may help to eliminate bronzing in alkali blue, phthalocyanine blue and possibly carbon black dispersions.

EXAMPLE 5

Evaluation of Flush Vehicles

Flushing vehicles 5–8 were prepared as follows:

Vehicle 5, which was treated as the control in this example, is a commercial flushing vehicle containing a blend of rosin maleic ester and the ink oil Magiesol 47, available from the Resinall Corp. as Resinall 4342.

Vehicle 6 is similar to the control, but was subjected to a soya oil modification process by heating a mixture of Vehicle 5 and soya oil to about 180° C., and holding several hours. Following the holding period, additional resin was added to achieve a target viscosity of 500–675 seconds at 100° F, Gardner line to line.

Vehicle 7 is similar to Vehicle 6, but menhaden oil was substituted for the soybean oil.

Vehicle 8 is similar to Vehicle 7, except that it was further modified with the polyamide resin Uni-rez 2940 according to the method of the present invention. In vehicle 8 a mixture of menhaden oil, Resinall R-434 rosin maleic ester and the Unirez 2940 polyamide resin were reacted at about 250° C. for about 2 hours.

The compositions of Vehicles 5–8 are described in Table 5 below.

TABLE 5

| Vehicle | 5 | 6 | 7 | 8 |
|---|---|---|---|---|
| Resin A (wt. %) | 67.0 | 64.6 | 62.4 | 60.4 |
| Soya Oil (wt. %) | — | 6.0 | — | — |
| Menhaden Oil (wt. %) | — | — | 6.8 | 6.5 |
| Resin B (wt. %) | — | — | — | 5.6 |
| Magiesol 47 (wt. %) | 33.0 | 29.4 | 30.8 | 27.5 |
| Total (wt. %) | 100.0 | 100.0 | 100.0 | 100.0 |

The components designated in Table 5 are as follows:
Resin A—Resinall R-434 (rosin ester flushing vehicle)
Resin B—Uni-rez 2940 (polyamide)
Menhaden Oil—(fish oil)
Magiesol 47—(ink oil)

Vehicles 5–8 were tested by flushing a lithol rubine presscake. Vehicle 1 was treated as the standard. The vehicles were evaluated for water shedability, effect on viscosity, tint strength and gloss as a measure of pigment wetting. Table 6 contains a summary of the results.

TABLE 6

| Resin Vehicle | Water Shed | Viscosity | Wetting | Tint Strength |
|---|---|---|---|---|
| 5 | 73% | standard | standard | standard |
| 6 | 77% | equal | equal | equal |
| 7 | 81% | heavy | poor | equal |
| 8 | 73% | soft | better | +5% |

As shown in Table 6, Vehicle 8, which contained the rosin modified maleic ester and the polyamide reacted according to the method of the present invention, produced the best flush color in terms of viscosity and pigment wetting. This vehicle would be ideal in an application requiring a flush vehicle with low viscosity or high pigment loading.

EXAMPLE 6

Comparative Evaluation of Flushing Vehicles

Vehicles 9–12 were evaluated as flushing resins for phthalo blue pigment presscake. The vehicles utilized in this example were prepared as follows:

Vehicle 9 was prepared by the procedure described in example 3, and is identical to Vehicle 1. In this reaction, soya oil, rosin maleic ester, and polyamide were co-reacted at 250° C. for about 2 hours. An aromatic hydrocarbon ester and the phenolic-modified rosin ester were added when the temperature of the reacted product fell below about 170° C. This vehicle exhibited excellent performance as a flushing vehicle for lithol rubines.

Vehicle 10 had essentially the same composition as Vehicle 9, but was prepared by co-reacting soya oil, rosin maleic ester, polyamide, an aromatic hydrocarbon ester and the phenolic-modified rosin ester at 250° C. for about 2 hours.

Vehicle 11 consisted of 90 parts by weight of Vehicle 10 blended with 10 parts by weight of an urethane-modified alkyd, Polyurethane Ink Resin 43-4390, available from Cargill Corp., Minneapolis, Minn. Alkyds are commonly utilized in the art to improve wetting, which results in improved water resistance and dry times for the vehicle, and are known to marginally improve the flushing of phthalo blue.

Vehicle 12 was a commercial flushing vehicle KB 412, available from Kustom Blending, Florence, Ky., which is known to provide superior results when used to flush a phthalo blue presscake.

The results are summarized in Table 7 below.

TABLE 7

| Vehicle | Water Shed | Viscosity | Wetting | Tint Strength |
|---|---|---|---|---|
| 9 | 73.5% | sl. softer | sl. better | equal |
| 10 | 72.6% | equal | equal | equal |
| 11 | 73.5% | sl. softer | sl. better | equal |
| 12 | 72.5% | standard | standard | standard |

As shown by the results for Vehicle 11 in Table 7, replacement of 10% of Vehicle 10 with the urethanated alkyd ink resin had only a minor positive effect on the finished flush color. This minor positive effect would likely be offset by the negative features of such an alkyd system, such the high cost of urethanated alkyds and the potential viscosity instability produced in a lithol rubine flush. Vehicle 10, which represents an embodiment of the present invention in which the resin components and the soya oil are all co-reacted at about 250° C. for about 2 hours, performed equally as well as a commercial flushing vehicle for phthalo blue utilized in Vehicle 12. Vehicle 9, a preferred embodiment of the present invention in which soya oil, rosin maleic ester, and polyamide were co-reacted at 250° C. for about 2 hours, and the aromatic hydrocarbon ester and the phenolic-modified rosin ester were added later at below about 170° C., performed just slightly better than Vehicle 10 and equal to Vehicle 11.

EXAMPLE 7

The following is an example of an alternative method of producing the flushing vehicle of the present invention using a reactive polyamide resin.

The following reactants were charged to a reactor:

| Formulation | Weight % |
|---|---|
| Rosin Maleated Ester (Resinall 434) | 43.50 |
| Soya Oil | 40.34 |
| Hydrocarbon Resin (Resinall 725) | 4.11 |
| Phenolic Modified Rosin Ester (Resinall 903) | 9.10 |
| Reactive Polyamide (Uni-rez 2900) | 2.95[1] |
| Total | 100.00 |

[1]Solids Basis.

The reactive polyamide resin, Uni-rez 2400, available from Union Camp Corp., Jacksonville, Fla., has an amine number of 50-57 and a Gardner viscosity at 25° C. of W-Y, as measured according to ASTM 29 (D 2083).

The reactants were heated with stirring to 250° C. and held for two hours to produce a reactive product, which was then cooled to about 180° C. and sampled for viscosity—Gardner line to line seconds at 100° F. Additional soya oil was added to adjust the viscosity to 600-800 seconds and the material was discharged from the reactor.

The resulting vehicle, referred to as Vehicle 13, had the following properties:

| | |
|---|---|
| Viscosity (Gardner, line to line, 100° F., sec) | 750 |
| Color (Gardner) | 15+ |
| Acid Number | 7.9 |
| Viscosity (Brookfield, Thermosel, 60° C.) | 7750 |
| Viscosity (Brookfield, Thermosel, 90° C.) | 800 |
| Isopropanol Tolerance (g/10 g) | 5.4 |
| Magiesol 47 Tolerance (g/10 g) | 60+ |
| Weight/Gallon (Pounds, 25° C.) | 8.6 |

EXAMPLE 8

The composition of Example 7, Vehicle 13, which utilized the high amine number reactive polyamide resin Uni-rez 2900, was compared to an identical composition (Vehicle 14) formulated with the non-reactive polyamide resin Uni-rez 2940 utilized in previous examples. Vehicle 14 was treated as the standard. The flushing performance of Vehicles 13 and 14 were compared on a lithol rubine presscake with a standard flush cycle of three water breaks followed by a vacuum drip.

The results are shown in Table 8 below:

TABLE 8

| Vehicle | 13 | 14 |
|---|---|---|
| Total Water Shed (Avg. 3 Breaks, %) | 82.0 | 81.9 |
| Tint Strength | Equal | Std. |
| Viscosity | Equal | Std. |
| Processing Time (Min.) | 100 | 97 |
| Vacuum Time to Dry (Min.) | 40 | 40 |

The flushing vehicles prepared with the reactive polyamide resin Uni-rez 2400 exhibited comparable flushing performance on lithol rubine to those prepared with the non-reactive polyamide resin Uni-rez 2940.

EXAMPLE 9

The vehicle of the present invention, utilizing the non-reactive polyamide resin Uni-rez 2940 (such as Vehicle 14 in the previous example), was compared to a well known and effective commercial flush vehicle, AKZO AKT-8601, available from Akzo Resins and Vehicles, Matteson, Ill. Lithol rubine and phthalo blue presscakes were flushed using each vehicle, and the AKT-8601 was treated as the standard. After the flush colors were produced, the initial viscosity was determined using an ICI cone and plate viscometer at 100° C. The viscosities were again measured following shelf storage at room temperature for periods of 7, 14 and 22 days.

The results are shown in Table 9 below:

TABLE 9

| Vehicle | AKT-8601 | | Vehicle 13 (Invention) | |
|---|---|---|---|---|
| Pigment | Blue | Lithol | Blue | Lithol |
| Initial Viscosity | 4.1 | 3.7 | 3.7 | 3.2 |
| Viscosity, 7 Days | 4.5 | 4.0 | 3.9 | 3.3 |
| Viscosity, 14 Days | 4.7 | 4.2 | 4.0 | 3.4 |
| Viscosity, 22 Days | 4.8 | 4.3 | 4.0 | 3.4 |

The results displayed in Table 9 show that flushes with the vehicle of the present invention had lower initial viscosities than the standard, which indicates that the present vehicle exhibits superior wetting of phthalo blue and lithol rubine pigments.

On phthalo blue, the standard had a 15% increase in viscosity following shelf storage of two weeks, while the present invention exhibited only a 7.5% increase. On lithol rubine, the standard had a 14% increase in viscosity, while the present invention had only a 6% increase. The lower viscosity gain indicates that the usability of pigments flushed with the present vehicle will not be reduced following extended periods of shelf storage and is significantly superior to the commercial standard.

EXAMPLE 10

The following is an example of an alternative method of producing the flushing vehicle of the present invention in which a portion of the soya oil is replaced with the ink oil Magiesol 47. Such vehicles are preferred for use in heat-set inks, and will be referred to as Vehicle 15. The properties of the Vehicle 15 will be compared to a similar composition, referred to as Vehicle 16, which does not contain the reactive polyamide component.

The compositions of Vehicles 15-16 are shown in Table 10 below:

TABLE 10

| Vehicle | 15 | 16 |
|---|---|---|
| Resin A (wt. %) | 47.43 | 49.72 |
| Soya Oil (wt. %) | 21.00 | 22.00 |
| A-100 (wt. %) | 4.48 | 4.69 |
| Resin B (wt. %) | 9.90 | 10.38 |
| Resin C (wt. %) | 3.26 | — |
| Magiesol 47 (wt. %) | 13.93 | 13.21 |
| Total (wt. %) | 100.00 | 100.00 |

In Table 10, the components are as follows:
Resin A—Rosin Maleated Ester (Resinall 434)
Resin B—Phenolic Modified Rosin Ester (Resinall 903)
Resin C—Non-Reactive Polyamide (Uni-rez 2940)

The resulting vehicles exhibited the properties shown in Table 11 below:

TABLE 11

| Vehicle | 15 | 16 |
|---|---|---|
| Viscosity (Gardner, line to line, 100° F., sec) | 690 | 697 |
| Color (Gardner) | 15+ | 15+ |
| Acid Number | 9.4 | 9.1 |
| Viscosity (Brookfield, Thermogel, 60° C.) | 7446 | 5464 |
| Viscosity (Brookfield, Thermogel, 90° C.) | 691 | 561 |
| Isopropanol Tolerance (g/10 g) | 5.30 | 5.43 |
| Magiesol 47 Tolerance (g/10 g) | Inf. | Inf. |
| Weight/Gallon (Pounds, 25° C.) | 8.20 | 8.48 |

Vehicles 15 and 16 were tested in a lithol rubine flush system. The vehicles were run through a standard flushing cycle using three water breaks, followed by vacuum drying. The results are shown in Table 12 below:

TABLE 12

| Vehicle | 15 | 16 |
|---|---|---|
| Total Water Shed (Average of 3 Breaks) | 73.4% | 72.0% |
| Tint Strength | Standard | Equal |
| Viscosity | Standard | Much Lower |
| Total Process Time (min) | 118 | 91 |

TABLE 12-continued

| Vehicle | 15 | 16 |
|---|---|---|
| Vacuum Time (min) | 53 | 43 |

The test varnish appeared better than the standard for wetting and viscosity reduction. These characteristics usually provide inks which are superior in transfer and gloss. The vehicle of the present invention, Vehicle 16, provides a significant improvement in overall properties compared to the standard.

What is claimed is:

1. A method for preparing a flushing vehicle, comprising the steps of heating a reaction mixture comprising a rosin-modified ester with an acid number of less than about 30, and about 2-16 wt. %, based on the weight of the ester, of an alkylene polyamide resin with an amine number less than about 110, to a temperature of about 190°-280° C.; and holding said reaction mixture at a temperature of 190°-280° C. for a sufficient time until the viscosity of said reaction mixture becomes constant.

2. A method according to claim 1, wherein said rosin modified ester is prepared by reacting a tall oil rosin, about 6-10 wt. % of an aliphatic unsaturated dicarboxylic acid or anhydride selected from the group consisting of fumaric acid, itaconic acid, acrylic acid and maleic anhydride, based on the total weight of the rosin and the aliphatic unsaturated carboxylic acid or anhydride, and a polyhydric alcohol selected from the group consisting of ethylene glycol, glycerol, pentaerythritol, and sorbitol.

3. A method according to claim 2, wherein said dicarboxylic acid is maleic anhydride and said alcohol is pentaerythritol.

4. A method according to claim 1, wherein the polyamide resin is selected from the group consisting of neutral and reactive polyamide resins, said neutral polyamide resins being the reaction product of diamines with stoichiometric amounts of dibasic acids or fatty acids or mixtures of dibasic acids and fatty acids, and mixtures of neutral and reactive polyamide resins.

5. A method according to claim 1, wherein said reaction mixture further comprises about 35 to about 60 wt. % of a vegetable oil, based on the total weight of the mixture.

6. A method according to claim 5, wherein the oil is soybean oil.

7. A method according to claim 1, wherein said polyamide is formed from a polyamine component that is selected from the group consisting of ethylene diamine, diethylene triamine, triethylene tetraamine, 1,4-diaminobutane, 2-methylpentane-1,5 diamine, and 1,8-diaminonapthalene.

8. A method according to claim 1, wherein the polyamide resin is a neutral polyamide resin with an amine number of about 10, said neutral polyamide resin being the reaction product of a diamine with a stoichiometric amount of a dibasic acid or a fatty acid or a mixture of a dibasic acid and a fatty acid.

9. A method according to claim 1, wherein the reaction mixture is heated to about 245°-260° C., and held at 245°-260° C. for about 2 hours.

10. A method according to claim 1, wherein said rosin is selected from the group consisting of tall oil rosin, gum rosin and wood rosin.

11. A method according to claim 1, wherein said vehicle has a Brookfield viscosity of about 100–2000 cps at 90° C.

12. A method according to claim 1, wherein said vehicle has an acid number of less than about 15.

13. A method according to claim 8, wherein said reaction mixture further comprises a reactive polyamide resin with an amine number of about 40 to about 110.

14. A method according to claim 1, wherein said reaction mixture further comprises at least one of a hydrocarbon resin and a phenolic modified rosin ester resin.

15. A method for preparing a flushing vehicle, comprising the steps of heating a reaction mixture comprising a tall oil rosin-modified maleic ester resin with an acid number of less than about 20, about 4–8 wt. %, based on the weight of the ester, of an polyamide resin with an amine number less than about 10, and about 35–60 wt. % of soybean oil to a temperature of about 245°–260° C.; and holding said reaction mixture at a temperature of 245°–260° C. for about 2 hours.

16. A method as claimed in claim 15, further comprising the step of cooling the reaction mixture, following the holding step, to less than 170° C. and blending with said mixture at least one of a hydrocarbon resin and a phenolic modified rosin ester resin.

17. A flush vehicle for lithographic inks, comprising the reaction product of a tall oil rosin-modified maleic ester resin with an acid number of less than about 30, and about 2–16 wt. %, based on the weight of the ester, of a polyamide resin with an amine number less than about 110.

18. A flush vehicle according to claim 17, further comprising about 35–60 wt. % of soybean oil.

19. A flush vehicle according to claim 18, further comprising a solvent selected from the group consisting of soybean oil, ink oil, and mixtures thereof.

20. A flush vehicle according to claim 17, wherein said vehicle further comprises at least one of a hydrocarbon resin and a phenolic modified rosin ester resin.

21. A flush vehicle according to claim 17, wherein the polyamide resin is a neutral polyamide resin with an amine number of about 10.

22. A flush vehicle according to claim 17, wherein the polyamide resin is a mixture of a neutral polyamide resin with an amine member of about 10 and a reactive polyamide resin with an amine number of about 40 to about 110, said neutral polyamide resin being the reaction product of a diamine with a stoichiometric amount of a dibasic acid or a fatty acid or a mixture of a dibasic acid and a fatty acid.

23. A flush vehicle for lithographic inks, comprising the reaction product of a tall oil rosin-modified maleic ester resin with an acid number of less than about 20, about 4–8 wt. %, based on the weight of the ester, of a polyamide resin with an amine number less than about 10, and about 20–50 wt. % of soybean oil, wherein said vehicle has a Brookfield viscosity of about 100–2000 cps at 90° C. and an acid number of less than about 15.

24. A flush vehicle for lithographic inks, wherein said vehicle is produced by heating a reaction mixture comprising a rosin modified maleic ester with an acid number of less than about 30, with about 4–8 wt. %, based on the weight of the ester, of a polyamide resin with an amine number less than about 10, and about 20–50 wt. % of soybean oil, to about 245°–260° C., and holding said reaction mixture at about 245°–260° C. for about 2 hours.

25. A lithographic ink comprising a water insoluble pigment and a resin, wherein said resin is produced by heating a reaction mixture comprising a rosin modified maleic ester with an acid number of less than about 30, with about 4–8 wt. %, based on the weight of the ester, of a polyamide resin with an amine number less than about 10, and about 20–50 wt. % of soybean oil, to about 245°–260° C., and holding said reaction mixture at about 245°–260° C. for about 2 hours.

26. A method according to claim 1, wherein said alkylene polyamide resin is formed from an alkylene polyamine component having the formula $H_2N-(R''NH)_x-H$ wherein $R''$ is an alkylene or aromatic radical having from 2–10 carbon atoms, and x is an integer of 1–4.

27. A method according to claim 1, wherein said polyamide resin is formed from an alkylene diamine component represented by the formula $H_2N-(R')_x-NH_2$ wherein $R'$ is an alkylene radical having from 2–8 carbon atoms, and x is an integer of 1–6.

28. A method according to claim 1 wherein said polyamide resin is formed from an alkylene diamine component selected from the group consisting of ethylene diamine, diaminopropane, diaminobutane, pentamethylene diamine and hexamethylene diamine.

29. A method according to claim 4, wherein said reactive polyamide resin is prepared by polycondensation of dimerized tall oil fatty acid with an excess of aliphatic polyamine.

* * * * *